United States Patent
Mamgain et al.

(10) Patent No.: US 9,443,262 B1
(45) Date of Patent: Sep. 13, 2016

(54) MERCHANDISE RESERVATION SYSTEM, APPARATUS, AND MEDIA

(71) Applicant: Sears Brands, L.L.C., Hoffman Estates, IL (US)

(72) Inventors: Prerna Mamgain, Hoffman Estates, IL (US); Kartik Swamy, Naperville, IL (US); Srinivasa Vanukuri, Palatine, IL (US); Amar Sharma, Schaumburg, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

(21) Appl. No.: 14/663,805

(22) Filed: Mar. 20, 2015

(51) Int. Cl.
*G06Q 30/00* (2012.01)
*G06Q 30/06* (2012.01)
*G06Q 10/08* (2012.01)

(52) U.S. Cl.
CPC ........ *G06Q 30/0631* (2013.01); *G06Q 10/087* (2013.01); *G06Q 30/0635* (2013.01)

(58) Field of Classification Search
CPC ............. G06Q 30/00; G06Q 30/0281; G06Q 30/0282; G06Q 30/0601; G06Q 30/0631
USPC .................................................. 235/383, 385
See application file for complete search history.

(56) References Cited

U.S. PATENT DOCUMENTS

| | | | | |
|---|---|---|---|---|
| 6,439,345 B1* | 8/2002 | Recktenwald | .......... | A47F 9/046 186/55 |
| 7,783,506 B2* | 8/2010 | Vaughan | ................ | G06Q 10/02 705/26.8 |
| 8,027,889 B1* | 9/2011 | Maroney | ................ | G06Q 20/12 705/26.61 |
| 8,818,873 B1* | 8/2014 | Kim | ....................... | G07G 1/0081 705/16 |
| 9,064,277 B2* | 6/2015 | Wong | ..................... | G06Q 30/06 |
| 2003/0036929 A1* | 2/2003 | Vaughan | ................ | G06Q 10/02 705/5 |
| 2007/0124216 A1* | 5/2007 | Lucas | ................... | G06Q 10/087 705/26.1 |
| 2008/0235108 A1* | 9/2008 | Kulakowski | ........... | G06Q 10/02 705/5 |
| 2008/0270251 A1* | 10/2008 | Coelho | ................... | G06Q 20/10 705/14.27 |
| 2009/0265251 A1* | 10/2009 | Dunlap | ................ | G06Q 10/087 705/26.1 |
| 2010/0318386 A1* | 12/2010 | Vaughan | ................ | G06Q 10/02 705/5 |

(Continued)

OTHER PUBLICATIONS

"Save more time. Reserve online and pick up in store", Staples.com, dated Mar. 17, 2014 (1 page).

(Continued)

*Primary Examiner* — Paultep Savusdiphol
(74) *Attorney, Agent, or Firm* — McAndrews, Held & Malloy, Ltd,

(57) ABSTRACT

Systems, methods, and apparatus are disclosed for reserving items of merchandise for in store pickup and/or inspection. In some embodiments, a reservation method for a store includes receiving, from a first computing device associated with a customer, a request to reserve a requested item for the customer. The reservation method may further include identifying, based on the requested item, an additional item to reserve for the customer. The reservation method may also include sending, to a second computing device associated with an employee of the store, a notification that instructs the employee to gather the requested item and the additional item and place the gathered items in a reserved merchandise area of the store.

20 Claims, 7 Drawing Sheets

(56) References Cited

U.S. PATENT DOCUMENTS

| | | | | |
|---|---|---|---|---|
| 2012/0316989 | A1* | 12/2012 | Wong | G06Q 30/06 |
| | | | | 705/26.9 |
| 2013/0085888 | A1* | 4/2013 | Kim | G06Q 30/0601 |
| | | | | 705/26.8 |
| 2013/0311324 | A1* | 11/2013 | Stoll | G06Q 30/0214 |
| | | | | 705/26.7 |
| 2014/0121967 | A1* | 5/2014 | Anbalagan | G01C 21/3476 |
| | | | | 701/540 |
| 2014/0125462 | A1* | 5/2014 | Feigin | G06K 7/10386 |
| | | | | 340/10.6 |
| 2014/0142992 | A1* | 5/2014 | Nuzzi | G06Q 30/0631 |
| | | | | 705/5 |
| 2014/0244411 | A1* | 8/2014 | Kim | G07G 1/0081 |
| | | | | 705/17 |
| 2014/0324616 | A1* | 10/2014 | Proietti | G06Q 30/0601 |
| | | | | 705/26.1 |
| 2015/0088698 | A1* | 3/2015 | Ackerman | G06Q 30/0637 |
| | | | | 705/26.82 |

OTHER PUBLICATIONS

"How to Reserve Items Online", Arlington Public Library, dated Mar. 17, 2014. (1 page).
"Reserve Online, Pickup in Store", Napa Auto Parts, dated Mar. 17, 2014. (1 page).
"Reserve Online", Barnes & Noble, dated Mar. 17, 2014. (1 page).
"Gap launches in-store pickup of items reserved online", Internet Retailer, dated Mar. 17, 2014. (4 pages).

* cited by examiner

MERCHANDISE RESERVATION SYSTEM, APPARATUS, AND MEDIA

FIELD OF THE DISCLOSURE

The present disclosure relates generally to the purchasing of merchandise, and more specifically, to features designed to aid and/or enhance a customer's purchasing experience.

BACKGROUND

Customers commonly purchase merchandise from brick-and-mortar stores such as retail stores, grocery stores, consumer electronic boutiques, etc. Customers also purchase merchandise via web sites that provide virtual storefronts that enable customers to purchase such merchandise without visiting a brick-and-mortar store. While on-line purchases may provide customers with some benefits over similar purchases made via a traditional brick-and-mortar store, customers may still prefer purchasing certain merchandise from a brick-and-mortar store. For example, with respect to clothing, many customers prefer to purchase clothing from a brick-and-mortar store. Purchasing from a brick-and-mortar store enables the customers to inspect the clothing in person, try on the clothing on to ensure a proper fit, and ensure an item of clothing (e.g., pants) pairs well with another item of clothing (e.g., shirt). Similarly, with respect to big ticket merchandise, such as home electronics, home appliances, etc., many customers prefer to the merchandise in operation before committing to a purchase.

Many customers may visit a particular brick-and-mortar store with the intention of seeing and/or purchasing specific items of merchandise. If the brick-and-mortar store no longer has one or more of the sought after items in stock, the customer may feel that their visit was for naught and thus may leave the store with a negative view their visit. Accordingly, if the brick-and-mortar store can ensure that the items of merchandise being sought by a customer are in stock or at least available for demonstration, then the brick-and-mortar store may increase the likelihood of a sale and increase the likelihood that the customer leaves with a positive view of their visit.

BRIEF SUMMARY OF THE DISCLOSURE

Shown in and/or described in connection with at least one of the figures, and set forth more completely in the claims are systems, methods, and computer readable medium that enable customers to reserve merchandise.

These and other advantages, aspects and novel features of the present disclosure, as well as details of illustrated embodiments thereof, will be more fully understood from the following description and drawings.

DETAILED DESCRIPTION

Some disclosed embodiments are directed to a merchandise reservation system that enables customers to reserve merchandise at a brick-and-mortar store. More specifically, some embodiments enhance a customer's requested reservation by reserving additional recommended items of merchandise. The merchandise reservation system may analyze past purchases of the customer, of other customers, sales data, demographic data, etc. in an attempt to recommend items that the customer may want to purchase in addition to the requested merchandise and/or instead of the requested merchandise. Furthermore, some embodiments may include a demand prediction system that provides stocking and/or restocking recommendations based on information gained from received customer reservations.

Figure 1:
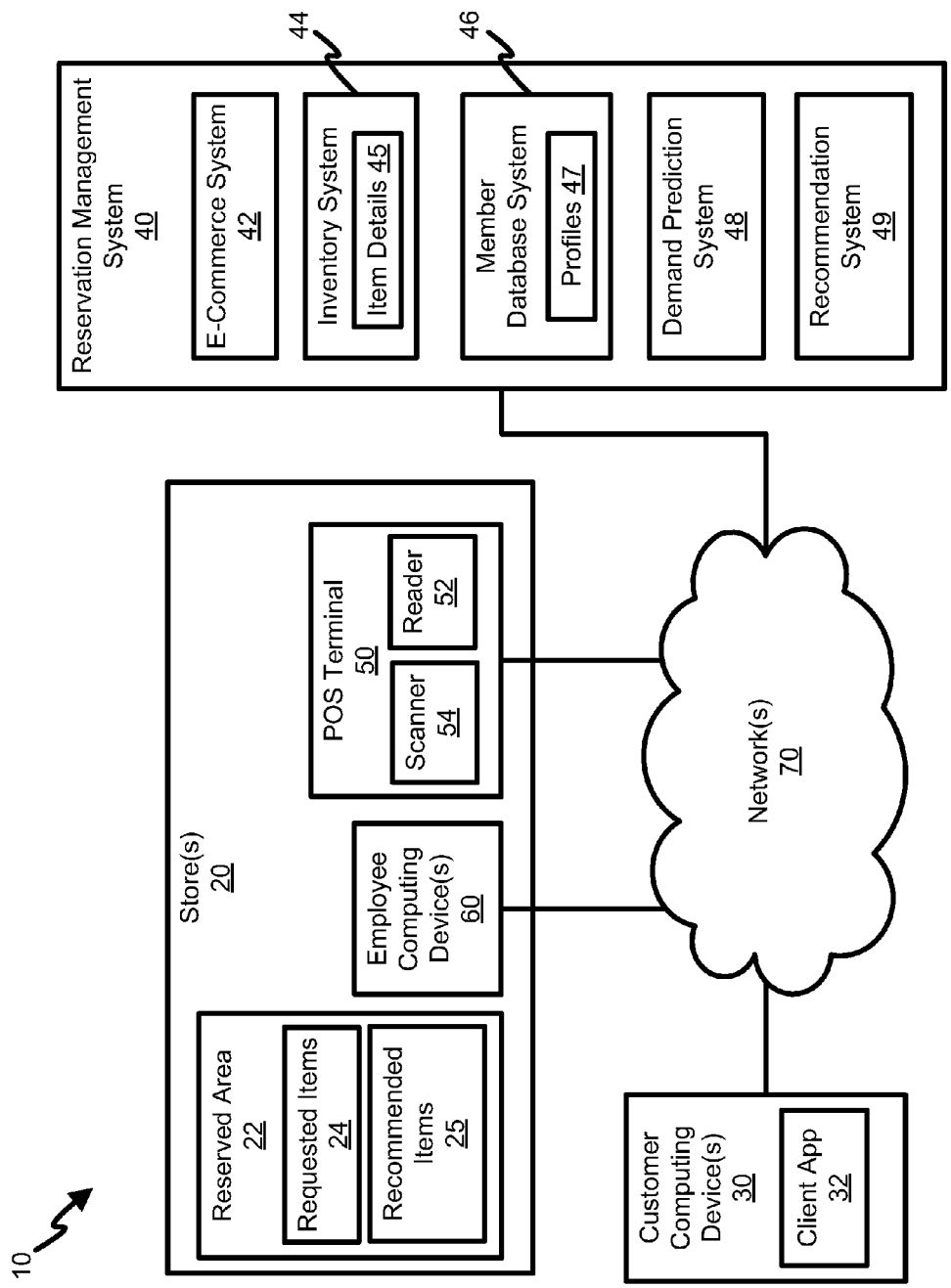
FIG. 1 shows an example merchandise reservation (MR) system in accordance with an example embodiment of the present disclosure.

Referring to FIG. 1, an example embodiment of a merchandise reservation (MR) system 10 is depicted. In general, the MR system 10 may enable customers to reserve merchandise at a brick-and-mortar store 20 serviced by the MR system 10. Moreover, the MR system 10 may collect reservation request data detailing which items were reserved as well as which items were recommended to customers due to received reservation requests. Managers may use such reservation request data to adjust stocking and restocking merchandise for the stores 20 serviced by the MR system 10.

As shown, the MR system 10 may include customer computing devices 30, a reservation management (RM) system 40, point-of-sale (POS) terminals 50, and employee computing devices 60 that are operatively coupled to a network 70. The network 70 may include a number of private and/or public networks that collectively provide one or more communication paths that interconnect the customer computing devices 30, the RM system 40, the POS terminals 50, and the employee computing devices 60. For example, the network 70 may include wireless and/or wired networks, LAN (local area network) networks, WAN (wide area network) networks, PAN (personal area network) networks, cellular networks, and/or the Internet.

The MR system 10 may provide its services to several different brick-and-mortar stores 20. In one embodiment, each brick-and-mortar store 20 corresponds to a different store location of the same retail store establishment. However, in other embodiments, the MR system 10 may provide its services to several different retail store establishments regardless of whether an affiliation exists between the retail store establishments. Each store 20 may maintain their own stock of merchandise. As such, even if each store 20 is a different store location of the same retail establishment, a particular store 20 may currently have an item in stock while the same item is currently out of stock at another store 20.

In light of such potential stock issues, a customer may utilize a customer computing device 30 to access the services of the RM system 40 and ensure that a chosen store 20 has sought after items for the customer. To this end, the customer may request the RM system 40 via computing device 30 to reserve an item at a particular store 20 to ensure that the item is present when the customer visits the store 20.

The customer computing devices 30 may include computing devices that enable a customer to communicate with the RM system 40. For example, the customer computing device 30 may be implemented as a smart phone, a tablet computing device, a laptop computing device, a desktop computing device, gaming console, wearable computing device, and/or some other computing device. The customer computing device 30 may further include an application 32 that is executed by the customer computing device 30 in order to communicate with the RM system 40 via the network 70. To this end, the application 32 may include a native application specifically designed for the customer computing device 30 to provide the customer computing device 30 with access to the RM system 40. For example, if the customer computing device 30 is an iPhone™ iPad™, an Apple® Watch™ or some other iOS™ device, then the application 32 may be a native iOS™ application that has been downloaded and installed from the App Store. Similarly, if the customer computing device 30 is a Windows™ computing device, the application 32 may be a native Windows™ application.

In other embodiments, the application 32 may not be a native application specifically designed for the respective computing platform. Instead, the application 32 may be implemented as a Web application in which various Web and/or Internet technologies, such as Hyper-Text Markup Language (HTML) pages, Javascript, etc., configure a web browser of the customer computing device 30 to provide the customer computing device 20 with access to the RM system 40.

As shown, the MR system 10 may include one or more point-of-sale (POS) terminals 50 associated with a particular retail establishment or store 20. In general, the POS terminals 50 may permit an employee or a customer to scan or otherwise identify the items of merchandise being purchased, determine the cost of the items being purchased, and effectuate payment for the items in order to complete the purchase or transfer of the items to a customer.

Figure 5:
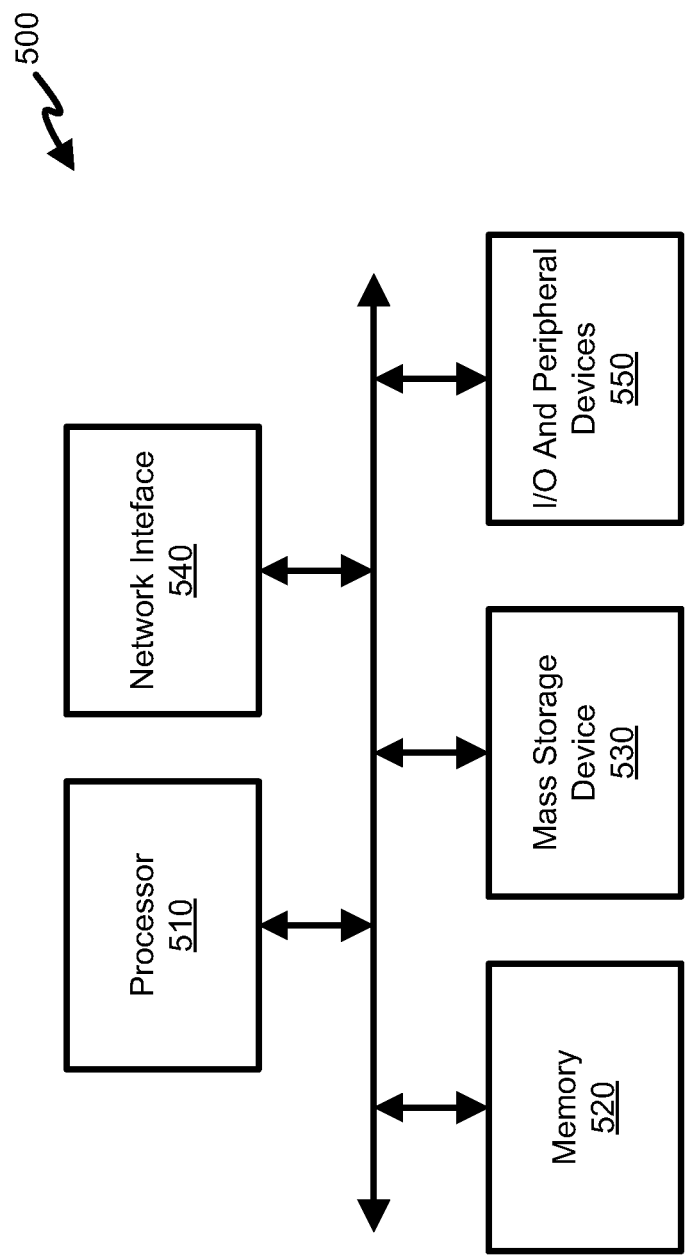
FIG. 5 shows a simplified depiction of an example computing device for use in the example MR system of FIG. 1.

To this end, the POS terminals 50 may be implemented using a computing device that includes hardware similar to a general computing device such as that shown in FIG. 5. However, besides hardware similar to that found in a general computing device, a POS terminal 50 may include additional hardware and/or peripherals not found in a typical computing device. For example, a POS terminal 50 may include a cash drawer, receipt printer, customer display in addition to a main display for the operator, a conveyor belt, a weight scale, a signature capture device, a customer pin pad device, a membership identifier (ID) reader 52, and a scanner 54. The scanner 54 may scan or read product identifiers from items being purchased. In particular, the scanner 54 may include a universal product code (UPC) barcode scanner that is configured to read UPC codes from the items being purchased.

The membership ID reader 52 may take on various forms depending upon the manner membership IDs are provided to the members of the loyalty program. In some embodiments, members may be given a membership card that has a magnetic stripe similar to those found on credit cards and debit cards. In such embodiments, the membership ID reader 52 may comprise a magnetic stripe reader similar to those used to read a swiped credit/debit card. Moreover, in such embodiments, the POS terminal 50 may include a single reader that is capable or reading both credit/debit cards as well as membership ID cards provided to the members of the loyalty program.

In some embodiment, the membership card may have a barcode similar to the UPC codes found on the goods offered for purchase. In such embodiments, the membership ID reader 52 may comprise a barcode reader similar to those used to scan the UPC codes on the items being sold. Moreover, in such embodiments, the POS terminal 30 may include a single scanner 54 that is capable or reading both barcode on the issued membership card as well as the UPC codes on the items being sold. Accordingly, in some embodiments, the reader 52 and the scanner 54 are provided by the same hardware element of the POS terminal 30. In yet other embodiments, members may be presented with a key fob or other device from which the assigned membership ID may be obtained. For example, the membership ID reader 52 may include an RFID transceiver, Near Field Communication (NFC) transceiver, or some other suitable device to read, scan, or otherwise interrogate the key fob in order to obtain the assigned membership ID.

The RM system 40 may generally reserve items in response to reservation requests received from customer computing devices 30. Moreover, the RM system 40 may generate reports based on the received reservation requests which may aid managers in stocking and/or restocking stores 20. To this end, the RM system 40 may include one or more web servers, database servers, routers, load balancers, and/or other computing and/or networking devices that cooperate to perform the above-noted functions. For example, the RM system 40 in one embodiment may include an e-commerce system 42, an inventory system 44, a member database system 46, a demand prediction system 48, and a recommendation system 49 which may each include one or more web servers, database servers, routers, load balancers, and/or other computing and/or networking devices.

The e-commerce system 42 generally provides a virtual storefront that a member may access via a customer computing device 20 in order to browse, research, and/or purchase items. In some embodiments, the e-commerce system 42 may permit members to utilize the services of the RM system 40 to reserve items at a particular store 20. In particular, the e-commerce system 42 may present a user interface to a customer via a customer computing device 20 that enables the customer to identify himself or herself as a member and request that a particular item be reserved at a selected store 20.

The inventory system 44 may maintain details 45 about items that the stores 20 and/or e-commerce system 42 have available for purchase. Such details 45 may include the quantity of each item that is available at each store 20 and via the e-commerce system 42. The details 45 may further include a description of each item as well as various attributes are variation for each item such as, for example, size, color, brand name, item SKU (stock keeping unit), price, associated promotional offers, etc.

The member database system 46 may maintain data about members who have registered with the RM system 40 and/or the e-commerce system 42. In particular, the member database system 46 may store a member profile 47 for each registered member that includes various information about that particular member. For example, each member profile 47 may include contact information (e.g., name, mailing address, shipping address, phone number, email address), payment information (e.g., debit card number, credit card number, checking account number, etc.), and a purchase history that identifies the items the respective member has purchased in the past. Each member profile 47 may further specify clothing sizes, color preferences, brand preferences, product quality/grade preferences, etc. of the respective member, which may aid in identifying items that are likely to meet the members expectations.

The demand prediction system 48 may generally predict demand for a particular item. As explained, in greater detail below, the demand prediction system 48 may generate a restocking and/or a stocking recommendation for an item based on a predicted demand for the item that takes into account a vast array of aspects including reservations requests received from customers. As such, the demand prediction system 48 may leverage received reservation requests to better assess and determine demand for a item.

Finally, the recommendation system 49 may provide recommendations based on items being reserved by a reservation request. The recommendation system 49 may review the customer's profile 47 as well as the profiles 47 of other customers in order to identify items of interest in light of the requested items. For example, based on demographics, purchase histories, and other information from the profiles 47, the recommendation system 49 may be able to identify other customers with similar purchasing behavior. Moreover, the recommendation system 49 may be able to identify customers with similar purchasing behaviors that have purchased one or more of the items being reserved. Based on such information, the recommendation system 49 may identify one or more items that are commonly purchased with the requested items 24 and thus are likely of interest for the customer.

The recommendation system 49 may further consider items that are similar to the items being reserved. For example, if the customer reserved a shirt, the recommendation system 49 may recommend the same shirt in a different color or a shirt having a similar style. Furthermore, the recommendation system 49 may further attempt to identify items that are commonly purchased together. For example, if the customer reserved shoes, the recommendation system 49 may recommend a matching belt and/or matching socks. It should be appreciated that the recommendation system 49 may be implemented using various data mining techniques that attempt to identify correlations between customers based on the profiles 47 and/or items based on purchase histories so that the recommendation system 49 may recommend items that the customer is likely to be interested in purchasing.

The recommendation system 49 may further identify items to recommend based on product categories. In particular, the recommendation system 49 may determine a product category for the requested item. The recommendation system 49 may then recommend other products in the same category and/or products in an associated category. With respect to products in the same category, the recommendation system 49 may recommend product that is at a different price point (e.g., 105% of the requested item) and/or that has a different feature set. For example, if the customer requested a digital camera be reserved, then recommendation system 49 may also reserve a more expensive digital camera with an improved feature set.

With respect to product in an associate category, the recommendation system 49 may identify another product category associated with the product category of the requested item. The recommendation system 49 may then select additional items from items in the associated product category. For example, if a customer requested a shirt be reserved, then the recommendation system 49 may identify a product category of "pants" as being associated with a product category of shirts and may select one or more items from the "pants" category. Similarly, if a customer requested a winter coat be reserved, then the recommendation system 49 may identify a product category of "gloves" as being associated with the product category of "winter coats" and may select one or more items from the "gloves" category.

FIG. 1 depicts an example embodiment of a MR system 10. However, the MR system 10 may be implemented in numerous different manners using a wide range of different computing devices, platforms, networks, etc. In particular, the MR system 10 in some embodiments may include a single customer computing device 30, a single RM system 40, a single point-of-sale terminal 50, and a single employee computing device 60. However, other embodiments may include multiple customer computing devices 30, RM systems 40, point-of-sale terminals 50, and/or employee computing devices 60. Moreover, aspects of the RM system 10 may be implemented using a client/server architecture, a peer-to-peer (P2P) architecture, and/or another networking architecture. Such embodiments are envisioned and protection for such embodiments is sought to the extent encompassed by the appended claims.

Figure 2A:
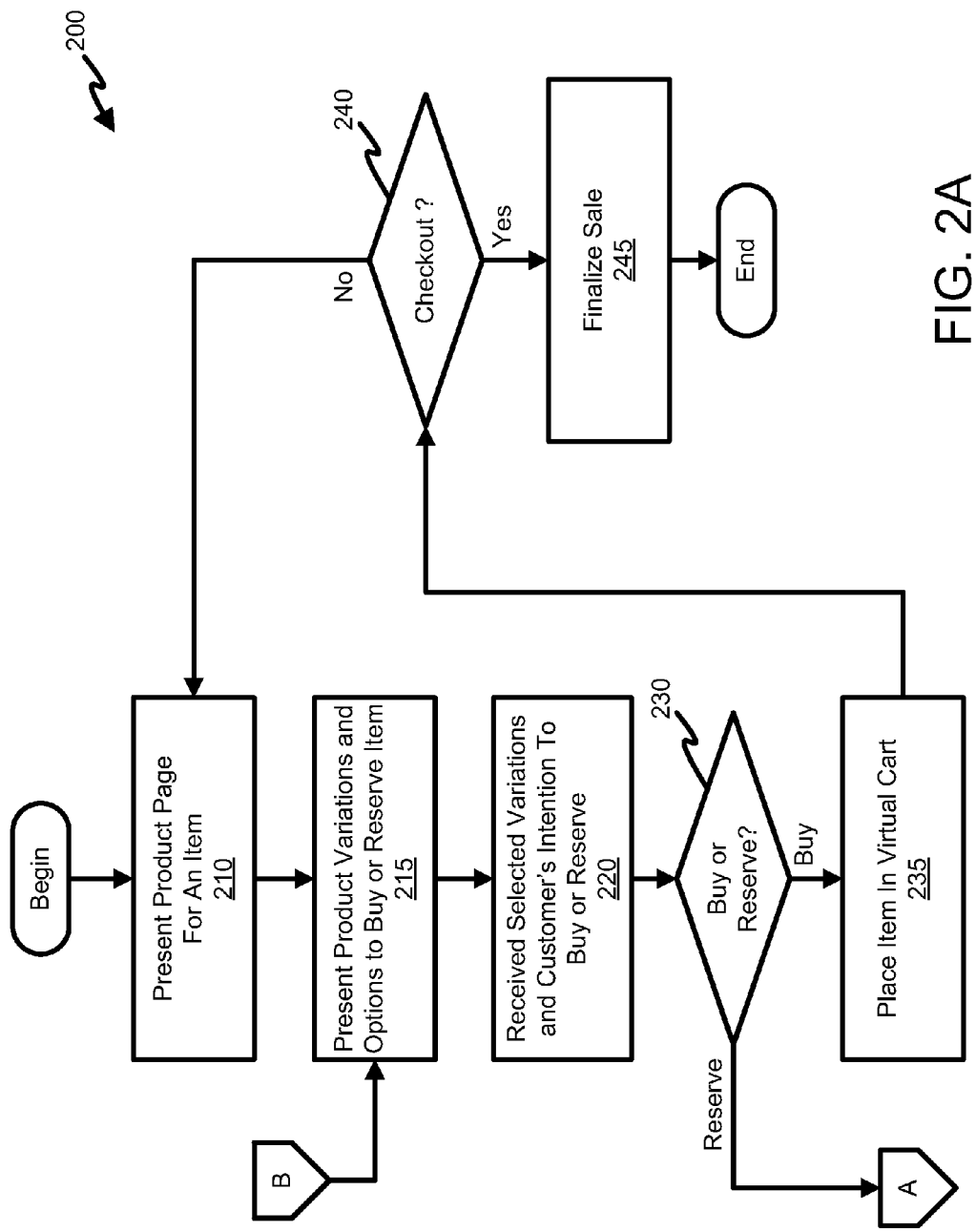
FIGS. 2A and 2B show a flow chart of a reservation process that may be implemented by the MS system shown in FIG. 1.
Figure 2B:
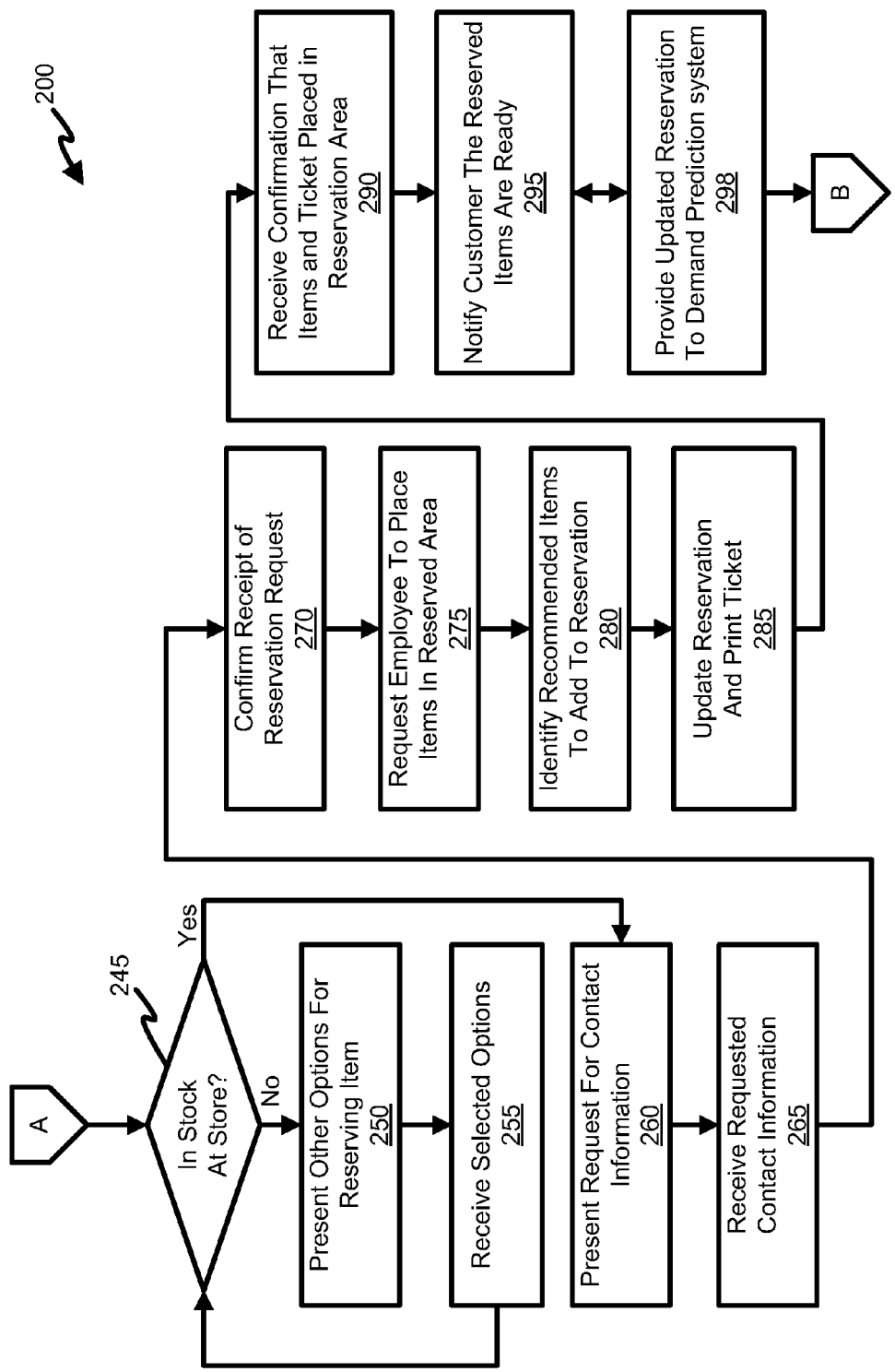

Referring now to FIGS. 2A and 2B, a flow chart is shown for a reservation process 200 that may be implemented by an embodiment of the MR system 10. In general, the reservation process 200 permits a customer to reserve one or more requested items 24 for in store pickup and/or inspection and further permits an employee to add recommended items 25 to those items 24 requested by the customer.

A customer may use a computing device 30 to generate a reservation request for items 24. However, a reservation request may be generated in other manners. For example, in some embodiments, an employee may use a POS terminal 50, an employee computing device 60, and/or some other computing device to generate a similar reservation request on behalf of a customer. In particular, the employee may generate such a reservation request in response to a telephone call from the customer. As another example, an employee may generate such a reservation request in order to reserve items at another store 20 if for example a customer desires to purchase items that are not in stock at the store 20 in which the employee works.

At 210, the e-commerce system 42 of the MR system 10 may present a product page to a customer via a customer computing device 30. In particular, the e-commerce system 42 may present the product page in response to a customer visiting, via the customer computer device 30, a virtual storefront provided by the e-commerce system 42. In particular, the customer may locate an item of interest that is offered by the e-commerce system 42 and/or one or more stores 20 as a result of browsing and/or searching the virtual storefront provided by the e-commerce system 42. The e-commerce system 42 may retrieve details 45 about the item of interest from the inventory system 44 and present a product page that includes various retrieved details 45 for the item 24.

In addition to presenting the customer with such details 45, the e-commerce system 42 at 215 may further present the customer with variations (e.g., size, color, quantity, etc.) with respect to the item. In particular, the e-commerce system 42 via the customer computer device 30 may present an interface via which the customer may select specific variations for the item. In some embodiments, the e-commerce system 42 may preselect one or more of these variations based on the profile 47 that is maintained for the customer. For example, based on information in the profile 47, the e-commerce system 42 may preselect a color, size, quantity, etc. for the item.

Besides enabling a customer to specify variations with respect to the item, the interface presented at 215 may further provide the customer with options to buy and/or reserve the item. For example, the presented interface may include both a "Buy It" button and a "Reserve In Store" button. When clicked or otherwise activated by the customer, the "Buy It" button may cause the e-commerce system 42 to place the specified item 24 in a virtual cart that holds selected items 24 until the customer checks out and finalizes a purchase of the placed items 24. The "Reserve In Store" button, when clicked or otherwise activated by the customer, may initiate creation of a reservation request for the specified item 24.

At 220, the e-commerce system 42 may receive, via the presented interface, the customer's selected variation of the item as well as the customer's intention to buy the specified item on-line or reserve the specified item in a store 20. If the e-commerce system 42 at 230 determines that the customer has elected to buy the specified item on-line, then the e-commerce system 42 at 235 may place the specified item in a virtual cart that holds the specified item until which time the customer is ready to check out and finalize a purchase of the items placed in the virtual cart at 245. If the e-commerce system 42 at 230 determines that the customer has elected to reserve the specified item in a store 20, then the e-commerce system 42 may proceed to 245 in order to initiate the creation of a reservation request for the specified item.

In response to initiating the creation of a reservation request, the e-commerce system 42 at 245 may determine whether a selected store 20 has the specified item in stock. To this end, the e-commerce system 42 may retrieve a previously-selected default or preferred store 20 from the customer's profile 47. Furthermore, the e-commerce system 42 may access the inventory system 44 to determine whether the selected store 20 has the specified item in stock.

If the e-commerce system 42 determines that the selected store 20 does not have the specified item in stock, the e-commerce system 42 at 250 may present the customer with other options for reserving the item. For example, the e-commerce system 42 may present the customer with an interface via the customer computing device 30 that enables the customer to (i) expand the inventory search to other stores 20 near the customer, (ii) specify a particular store 20 to inventory check for the specified item, and/or (ii) modify one or more aspects of the specified item (e.g., specify a different color, size, quantity, etc.). At 255, the e-commerce system 42 may receive, via the presented interface, the customer's selected options for reserving the item. The e-commerce system 42 may then return to 245 to determine whether the item 24 is in stock based on the received options.

At 260, the e-commerce system 42 may present the customer with an interface via customer computing device 30 from which the customer may confirm and/or supply contact information. In some embodiments, the e-commerce system 42 may obtain the contact information from the profile 47 for the customer. In such embodiments, the interface may present the contact information obtained from the profile 47 and provide the customer opportunity to confirm and/or modify the presented contact information to be associated with the reservation.

At 265, the e-commerce system 42 may receive the contact information from the customer computing device 30. In response to receiving the contact information, the e-commerce system 42 at 270 may send the customer a confirmation that the reservation request has been received. For example, the e-commerce system 42 may present, to the customer via customer computing device 30, a confirmation web page that includes a message confirming the receipt of the reservation request. The e-commerce system 42 may alternatively and/or in addition to presenting such a confirmation page send the customer confirmation messages via other communication channels. For example, the e-commerce system 42 may send an e-mail message, an instant message, a SMS (short message service) message, etc.

The e-commerce system 42 at 275 may request an employee of the selected store 20 to locate and place the requested item 24 in the reservation merchandise area 22 of the store 20. In particular, the e-commerce system 42 may send the reservation request to an employee via a employee computing device 60. At 275, the employee computing device 60 may present the employee a list of requested items 24 as specified in the received reservation request as well as an interface via which the employee may confirm whether each requested item 24 was found and placed in the reserved merchandise area 22 of the store 20.

Via the employee computing device 60, the employee at 280 may recommend additional and/or alternative items 25 for the customer. For example, if the customer reserved a particular shirt, the employee may add the same style shirt in a different color and/or a shirt of the same color but different style to requested items 24 placed in the reserved merchandise area 22 for the customer. Similarly, if the customer reserved a particular shirt, the employee may retrieve the customer's pant and shoe size from the customer's profile 47 and add matching pants and shoes in the customer's size to the requested items 24. In some embodiments, the employee may identify such recommended items 25 based on their own personal knowledge of the customer and/or personal knowledge of purchases by other customers. In other embodiments, the employee may request that the recommendation system 49 provide recommendations for the customer based on the requested items 24, the customer's profile 47, past purchases of the reserved item 24, clearance items for the store 20, sale items for the store 20, and/or current inventory of the store 20.

After obtaining the additional recommended items, the employee via the employee computing device 60 may update the reservation to include the recommended items 25 and print a reserve ticket at 285. The reserve ticket may identify the requested items 24, the recommended items 25, and the customer for which the items 24, 25 are reserved. The employee may include the reserve ticket with the items 24, 25 placed in the reserved merchandise area 22 to help aid the customer in collecting their requested items 24 and recommended items 25.

The employee at 290 may notify the e-commerce system 42 via the employee computing device 60 that the requested items 24 have been placed in the reserved merchandise area 22. The e-commerce system 42 at 295 may then notify the customer that their requested items 24 have been reserved and are ready for pickup and/or inspection. In particular, the e-commerce system 42 may send a notification message to the customer based on contact information in the customer's profile 47 and or contact information provided by the customer when creating the reservation request. For example, the e-commerce system 42 may provide such notification by sending an email message, sending a SMS text message, sending an instant message, calling a telephone number to present an audio message, or utilizing some other communications method in order to inform the customer that their reserved items 24 are ready. In some embodiments, the e-commerce system 42 may further provide a notification banner toward the top of presented web pages of the virtual storefront that informs the customer that their reserved items are ready. In this manner, if the customer is still using the virtual storefront or revisits the virtual storefront at a later date, the customer may receive a reminder of their reserved items.

At 298, the demand prediction system 48 may receive or receive data regarding the reservation request including the reserved items 24 and recommended items 25. As explained in greater detail below, the demand prediction system 48 may utilize the data provided by the received reservation requests to estimate demand for items. Such demand estimations may be used to adjust stocking and restocking of the items for the store 20 at which the items were reserved as well as other stores 20 of the retail establishment.

Figure 3A:
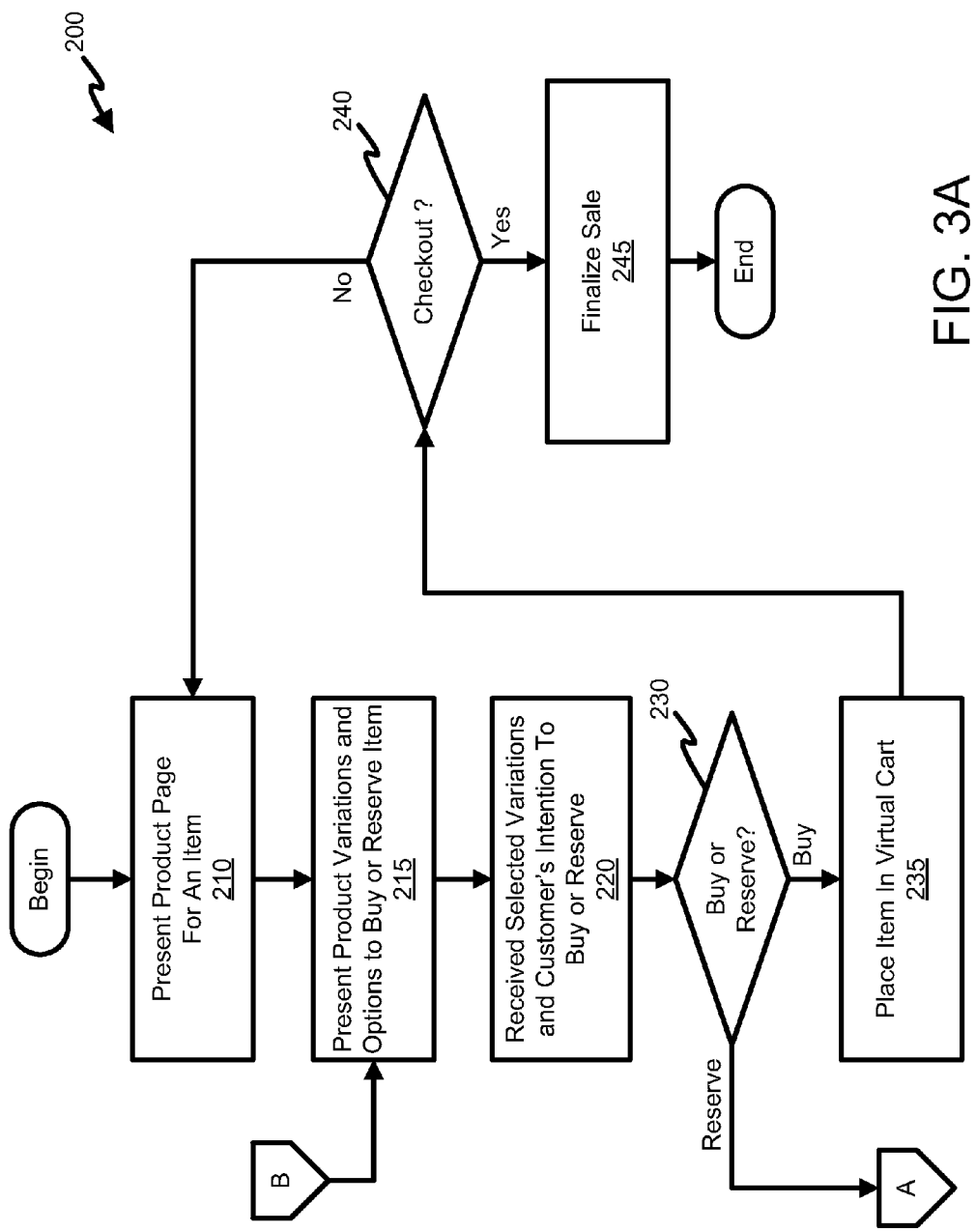
FIGS. 3A and 3B show a flow chart of another reservation process that may be implemented by the MS system shown in FIG. 1.
Figure 3B:
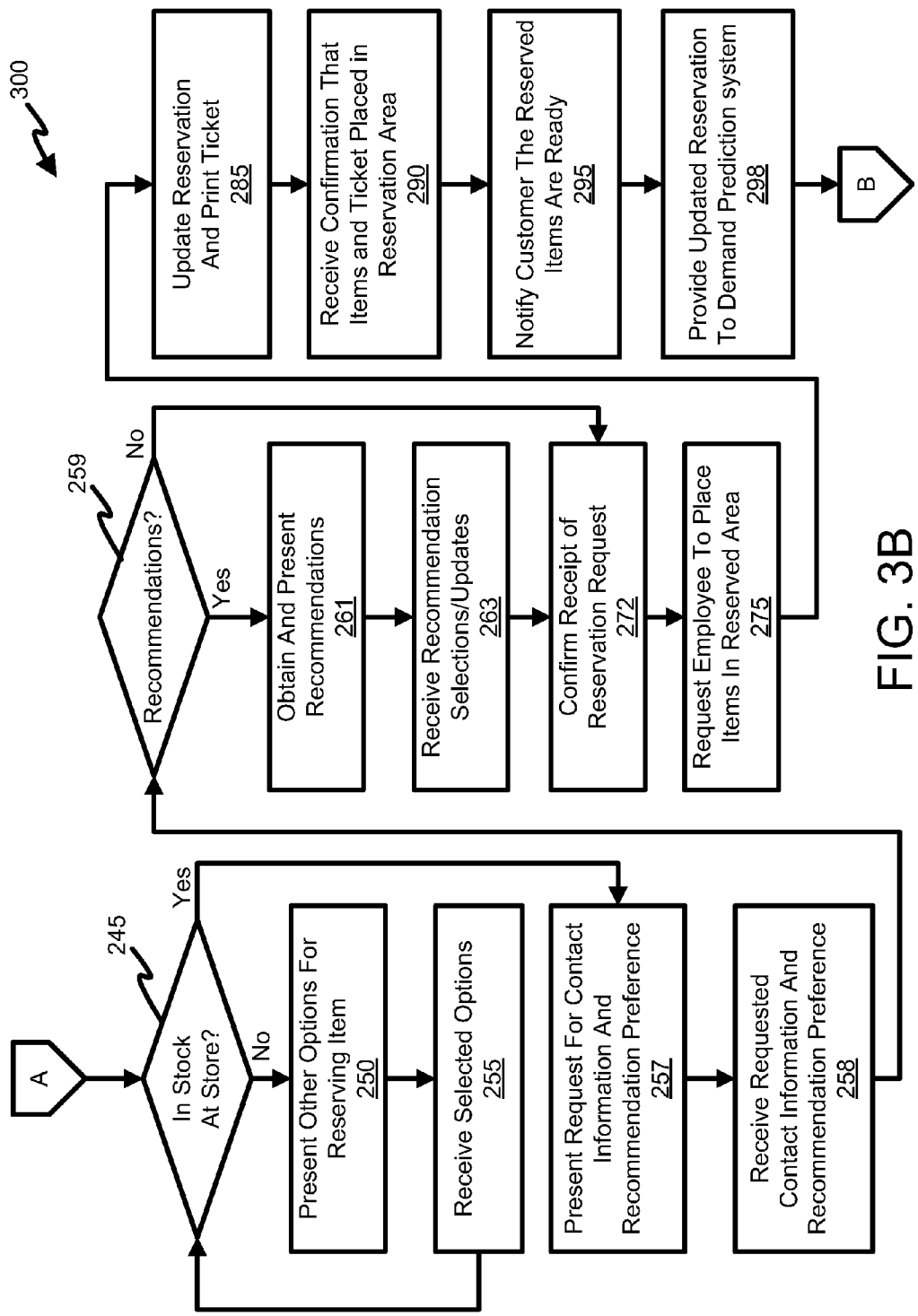

Referring now to FIGS. 3A and 3B, a flow chart is shown for another reservation process 300 that may be implemented by an embodiment of the MR system 10. Several aspects of the reservation process 300 may be implemented in a similar manner as corresponding aspect of the reservation process 200 shown in FIGS. 2A and 2B. As such, FIGS. 3A and 3B present such similar aspects with the same reference numeral as corresponding aspects of FIGS. 3A and 3B. Moreover, in the interest of not obscuring differences between the processes 200 and 300, the following description of FIGS. 3A and 3B does not address such similar aspects.

As explained in more detail below, the reservation process 300 of FIGS. 3A and 3B like reservation process 200 of FIGS. 2A and 2B may permit a customer to reserve one or more items for in store pickup and/or inspection. However, unlike the reservation process 200, the reservation process 300 may automatically identify items to recommend to the customer and present such recommended items 25 to the customer during the creation of the reservation request. In this manner, the customer may approve, decline, and/or revise one or more of the recommended items 25 before such items are located by an employee and placed in the reserved merchandise area 22.

The e-commerce system 42, in a manner similar to 260 of the reservation process 200, may present at 257 the customer with an interface via customer computing device 30 from which the customer may confirm and/or supply contact information. However, the e-commerce system 42 may further generate the interface such that it further requests permission to make recommendations based on the requested items 24.

Accordingly, the e-commerce system 42 may receive the requested contact information at 258 in a manner similar to 265 of the reservation process 200. However, besides the contact information, the e-commerce system 42 may further receive an indication of whether the customer is interested in seeing some recommended items 25 that have been selected based on the requested items 24.

If the e-commerce system 42 determines at 259 that the customer is interested in seeing some recommended items 25, then the e-commerce system 42 at 261 may obtain recommended items 25 from the recommendation system 49 and present the recommended items 25 to the customer via customer computing device 30. To this end, the e-commerce system 42 may send the recommendation request to the recommendation system 49 in order to identify which items are being requested by the customer as well as which customer is requesting the items 24. The recommendation system 49 may review the customer's profile 47 as well as the profiles 47 of other customers in order to identify recommended items 25.

At 263, the e-commerce system 42 may receive from the customer information regarding the recommended items 25. In particular, the customer may accept one or more of the recommended items 25 to be placed with their reservation. Conversely, the customer may reject one or more of the recommended items 25 to prevent such item from being placed with their reservation. Furthermore, the customer may specify one or more variations for the recommended items 25. For example, the customer may specify a different size, color, or some other variation of the recommended item 25.

After receiving the customer information regarding the recommended items 25, the e-commerce system 42 may confirm receipt of the reservation request at 272. The reservation may then be processed by the MR system 10 in a manner similar to process 200 described above. However, as shown, the reservation process 300 does not include 280 and thus the employee in an embodiment of the reservation process 300 does not recommend items to be added to reservations since the e-commerce system 42 has already presented the customer with recommended items 25.

As noted above, reservation processes 200 and 300 provide reservation requests to a demand prediction system 48 so that the demand prediction system 48 may estimate and/or update estimated demand based on received reservation requests. It should be appreciated that reservation requests may enable the demand prediction system 48 to better estimate the true customer demand for items than can be obtained by merely analyzing sales data. For example, if a store 20 does not have an item in stock, then the item cannot be sold to a customer who may have otherwise purchased the item. However, the e-commerce system 42 may receive reservation requests to pickup and/or inspect such an out-of-stock item at the store 20. Such a request may still go unfulfilled and there may be no record of the event in the sales data. However, the e-commerce system 42 may provide such reserve requests to the demand prediction system 48 thus providing the demand prediction system 48 with data indicative of unmet demand.

Figure 4:
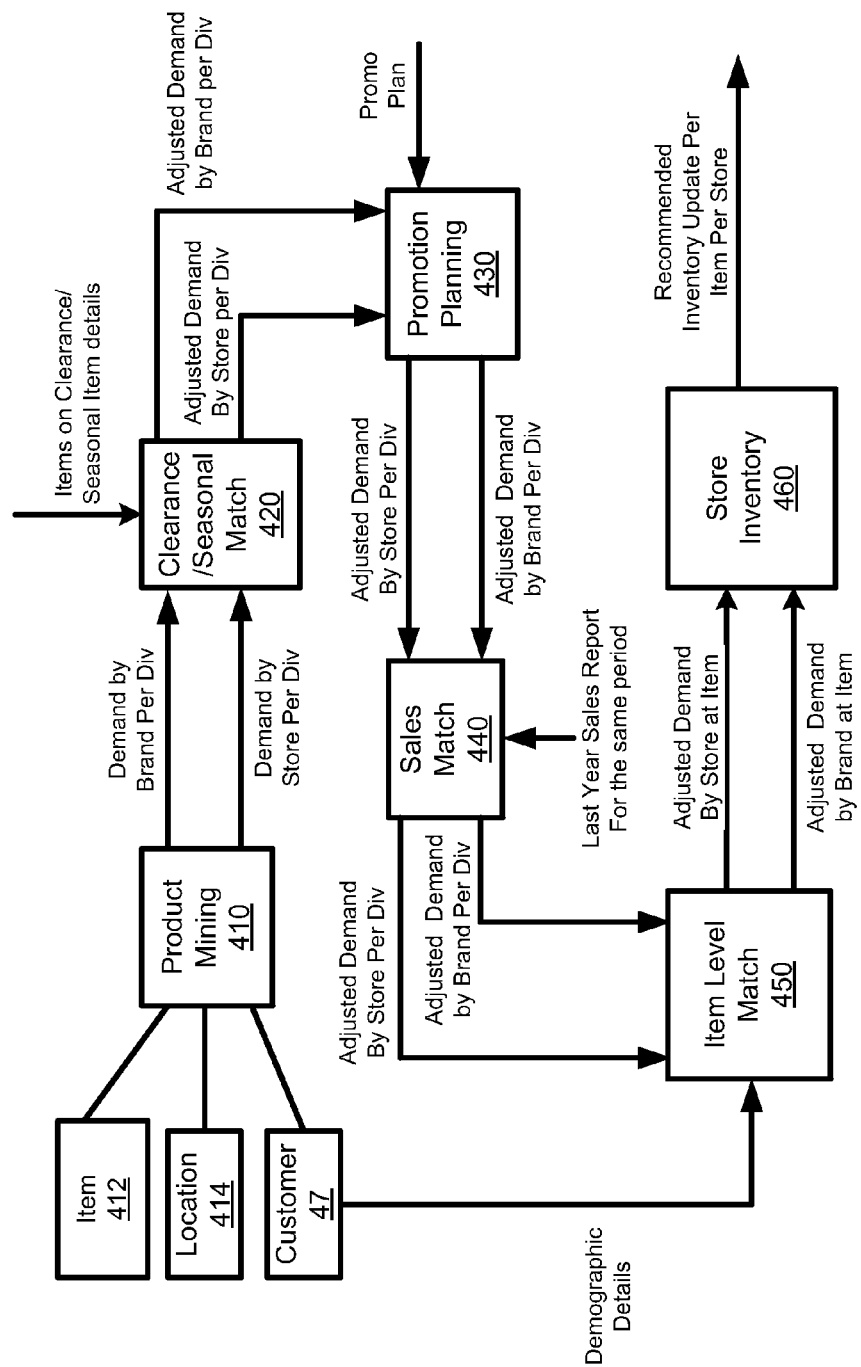
FIG. 4 shows a block diagram of an example demand prediction system of the MR system of FIG. 1.

Referring now to FIG. 4, block diagram of on embodiment of the demand prediction system 48 is shown. As shown, the demand prediction system 48 may include a product mining module 410, a clearance/seasonal matching module 420, a promotion planning module 430, a sale matching module 440, an item level matching module 450, and store inventory module 460.

The product mining module 410, in one embodiment, receives item details 412. Such item details 412 may include data gleaned from recommendation requests such as requested items 24 and recommended items 25 for such requests. The product mining module 410 further receives store location details 412, which includes information regarding sales at each store 20 as well as items offered for sale at each store 20. The product mining module 410 may further receive location details 414, which provide data regarding the various store locations. Furthermore, the product mining module 410 receives customer details from customer profiles 47. Based on such received data, the product mining module 410 may determine (i) item demand by brand per store division and (ii) item demand by store 20 per store division.

The clearance/seasonal matching module 420 may received from the product mining module 410 the determined item demand data. The clearance/seasonal matching module 420 may further receive items on clearance data and/or seasonal item data. Based on such received data, the clearance/seasonal matching module 420 may adjust item demand data received from the product mining module 410 to account for clearance and seasonal items.

The promotion planning module 430 may received from the clearance/seasonal matching module 420 the item demand data adjusted for clearance and seasonal effects. The promotion planning module 420 may further receive details regarding promotional plans for an upcoming period of time (e.g., next four weeks). Based on such received data, the promotion planning module 430 may adjust item demand data received from the clearance/seasonal matching module 420 to further account for upcoming promotional plans.

The sales matching module 440 may receive, from the promotion planning module 430, the item demand data adjusted for anticipated effects from upcoming promotional plans. The sales matching module 440 may further receive details regarding last years sales data for the sales period being predicted. Based on such received data, the sales matching module 440 may further adjust item demand data received from the promotion planning module 430 based on actual sales data for the same sales period of the prior year.

The item level matching module 450 may receive, from the sales matching module 430, the item demand data adjusted based on last years sales data. The item level matching module 450 may further receive demographic details from the customer profiles 47. Based on such received data, the item level matching module 450 may further adjust item demand data received from the sales matching module 440 based on the customer demographic data obtained from the customer profiles 47.

Finally, the store inventory module 460 may receive, from the item level matching module 450, the item demand data adjusted based on customer demographics. The store inventory module 460 may then determine a recommended inventory update per item per store 20 based on current inventory levels per store 20. In this manner, the demand prediction system 48 may provide stocking and/or restocking recommendations per item per store based, at least in part, upon recommendation requests.

In some embodiments, the customer computing devices 30, the RM system 40, the e-commerce system 42, the inventory system 44, the member database system 46, the demand prediction system 48, and the recommendation system 49 may be implemented using one or more computing devices and/or embedded computing devices. FIG. 5 provides a simplified depiction of a computing device 500 suitable for such aspects of MR system 10. As shown, the computing device 500 may include a processor 510, a memory 520, a mass storage device 530, a network interface 540, and various input/output (I/O) and peripheral devices 550. The processor 510 may be configured to execute instructions, manipulate data and generally control operation of other components of the computing device 500 as a result of its execution. To this end, the processor 510 may include a general purpose processor such as an x86 processor or an ARM processor which are available from various vendors. However, the processor 510 may also be implemented using an application specific processor, microcontroller, and/or other circuitry.

The memory 520 may include various types of random access memory (RAM) devices, read only memory (ROM) devices, flash memory devices, and/or other types of volatile or non-volatile memory devices. In particular, such memory devices of the memory 520 may store instructions and/or data to be executed and/or otherwise accessed by the processor 510. In some embodiments, the memory 520 may be completely and/or partially integrated with the processor 510.

In general, the mass storage device 530 may store software and/or firmware instructions which may be loaded in memory 520 and executed by processor 510. The mass storage device 530 may further store various types of data which the processor 510 may access, modify, and/otherwise manipulate in response to executing instructions from memory 520. To this end, the mass storage device 530 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 540 may enable the computing device 500 to communicate with other computing devices via network 70. To this end, the networking interface 540 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 500 and network 70 and/or another computing device.

Finally, the I/O and peripheral devices 550 may generally provide devices which enable a user to interact with the computing device 500 by either receiving information from the computing device 500 and/or providing information to the computing device 500. For example, the I/O and peripheral devices 550 may include display screens, keyboards, mice, touch screens, microphones, audio speakers, digital cameras, optical scanners, RF transceivers, etc. The I/O and peripheral devices 550 for a POS terminal 30 may especially include a cash drawer, receipt printer, a conveyor belt, a weight scale, a signature capture device, a customer pin pad device, a membership ID reader, and product scanner.

While the above provides some general aspects of a computing device 500, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 500 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Various embodiments have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 2A, 2B, 3A, 3B, and 4.

While the present disclosure has described certain embodiments, it will be understood by those skilled in the art that various changes may be made and equivalents may be substituted without departing from the intended scope of protection. In addition, many modifications may be made to adapt a particular situation or material to the teachings of the present disclosure without departing from its scope. Therefore, it is intended that the present disclosure not be limited to the particular embodiment or embodiments disclosed, but encompass all embodiments falling within the scope of the appended claims.

What is claimed is:

1. A reservation method for a store, comprising:
receiving, from a first computing device associated with a customer, a request to reserve a requested item for the customer;
identifying, based on the requested item, an additional item that was not requested by the customer;
reserving the requested item and the non-requested, additional item for the customer; and
sending, to a second computing device associated with an employee of the store, a notification that instructs the employee to gather the requested item and the non-requested, additional item and place the gathered items in a reserved merchandise area of the store.

2. The reservation method of claim 1, further comprising sending, to the first computing device, a confirmation that informs the customer that the request to reserve the requested item has been received.

3. The reservation method of claim 1, further comprising sending, to the first computing device, a confirmation that informs the customer that the requested item has been reserved after verifying the requested item is in stock.

4. The reservation method of claim 1, further comprising adjusting restocking of the requested item based on received requests to reserve the requested item.

5. The reservation method of claim 1, further comprising adjusting restocking of an item associated with the requested item based on received requests to reserve the requested item.

6. The reservation method of claim 1, further comprising sending, to the first computing device, a confirmation that informs the customer that the requested item has been reserved and instructs the customer to pickup the requested item from the reserved merchandise area.

7. The reservation method of claim 1, wherein said identifying comprises selecting the additional item based on items other customers have purchased with the requested item.

8. The reservation method of claim 1, wherein said identifying comprises:
determining a first product category for the requested item;
identifying, based on past purchases, a second product category associated with the first product category; and
selecting the additional item from a plurality of items in the second product category.

9. The reservation method of claim 1, wherein said identifying comprises selecting, for the additional item, the requested item but of a different size than requested.

10. The reservation method of claim 1, wherein said identifying comprises selecting, for the additional item, the requested item but of a different color than requested.

11. The reservation method of claim 1, wherein said identifying comprises:
determining a product category for the requested item; and
selecting, for the additional item, an item from the product category at a different price point and feature set.

12. A system, comprising:
a first computing device associated with an employee of a store; and
a reservation management system configured to:
receive, from a second computing device associated with a customer, a request to reserve a requested item for the customer;
identify, based on the requested item, an additional item not requested by the customer;
reserve the requested item and the non-requested, additional item for the customer; and
send, to the employee of the store via the first computing device, a notification that instructs the employee to gather the requested item and the non-requested, additional item and place the gathered items in a reserved merchandise area of the store.

13. The system of claim 12, wherein reservation management system is further configured to send to customer a confirmation that informs the customer that the request for the requested item has been received.

14. The system of claim 12, wherein the reservation management system is further configured send, to the customer after verifying the requested item is in stock, a confirmation that informs the customer that the request has been received.

15. The system of claim 12, wherein the reservation management system is further configured to provide a restocking recommendation of the requested item based on received requests to reserve the requested item.

16. The system of claim 12, wherein the reservation management system is further configured to provide a restocking recommendation of an item associated with the requested item based on received requests to reserve the requested item.

17. The system of claim 12, wherein the reservation management system is further configured to send a confirmation that informs the customer that the requested item has been reserved and instructs the customer to pickup the requested item from the reserved merchandise area of the store.

18. The system of claim 12, wherein the reservation management system is further configured to select the additional item based on items other customers have purchased with the requested item.

19. The system of claim 12, wherein the reservation management system is further configured to:
determine a first product category for the requested item;
identify, based on past purchases, a second product category associated with the first product category; and
select the additional item from a plurality of items in the second product category.

20. The system of claim 12, wherein the reservation management system is further configured to select, for the additional item, the requested item but of a different size than requested.

* * * * *